(12) United States Patent
Cortright

(10) Patent No.: US 6,467,830 B1
(45) Date of Patent: Oct. 22, 2002

(54) SELF CONTAINED STORAGE DEVICE FOR TRUCKS

(76) Inventor: Richard J. Cortright, 3635 S. Argonne St., Aurora, CO (US) 80013

( * ) Notice: Subject to any disclaimer, the term of this patent is extended or adjusted under 35 U.S.C. 154(b) by 0 days.

(21) Appl. No.: 09/803,438

(22) Filed: Mar. 9, 2001

(51) Int. Cl.$^7$ .................................................. B60N 3/12
(52) U.S. Cl. ................ 296/37.6; 296/26.04; 296/26.05; 312/312
(58) Field of Search ............................ 296/37.6, 26.04, 296/26.05, 100.07, 160; 312/312, 310; 224/404; 220/8

(56) References Cited

U.S. PATENT DOCUMENTS

| 4,252 A | * | 7/1845 | White .......................... 56/384 |
| 294,388 A | * | 3/1884 | Hull ............................ 312/312 |
| 1,144,398 A | * | 6/1915 | Thommen ..................... 312/310 |
| 1,428,629 A | * | 9/1922 | Gunn ........................... 312/312 |
| 1,998,937 A | * | 4/1935 | McGinnis ................... 296/26.04 |
| 2,739,833 A | * | 3/1956 | Schenkel et al. ......... 296/26.05 |
| 2,756,094 A | * | 7/1956 | Marple ..................... 296/26.05 |
| 2,784,027 A | * | 3/1957 | Temp ........................... 224/404 |
| 2,797,124 A | * | 6/1957 | Hauptli ..................... 296/26.05 |
| 2,827,004 A | * | 3/1958 | Luce et al. ..................... 220/8 |
| 2,861,857 A | * | 11/1958 | Le et al. ..................... 312/312 |
| 3,000,664 A | * | 9/1961 | Martin ...................... 296/26.05 |
| 3,485,479 A | * | 12/1969 | Baker ....................... 296/26.05 |
| 3,690,719 A | * | 9/1972 | Ypunt ..................... 296/100.07 |
| 4,328,989 A | | 5/1982 | Childers |
| 4,469,364 A | | 9/1984 | Raffi-Zadeh |
| 4,603,901 A | | 8/1986 | McIntosh et al. |
| 4,815,786 A | | 3/1989 | McRay |
| 4,830,242 A | | 5/1989 | Painter |
| 4,848,830 A | | 7/1989 | Parson |
| 4,936,624 A | | 6/1990 | West |
| 5,028,088 A | * | 7/1991 | Del Monico et al. .... 296/26.04 |
| 5,129,611 A | * | 7/1992 | Grover et al. ............. 312/312 |
| 5,374,094 A | * | 12/1994 | Smith et al. ............. 296/26.05 |
| 5,564,776 A | * | 10/1996 | Schlachter ................. 296/37.6 |
| 5,593,201 A | | 1/1997 | Bateman |
| 5,897,154 A | * | 4/1999 | Albertini et al. .......... 296/37.6 |
| 5,961,176 A | * | 10/1999 | Tilly ....................... 296/26.04 |
| 6,010,022 A | * | 1/2000 | Deaton ......................... 220/8 |
| 6,126,220 A | * | 3/2000 | Brasher ................... 296/26.04 |
| 6,283,526 B1 | * | 9/2001 | Keough et al. ............ 296/37.6 |
| 6,318,781 B1 | * | 11/2001 | Mc Kee .................... 296/37.6 |
| 6,325,447 B1 | * | 12/2001 | Kuo ........................... 296/160 |

* cited by examiner

Primary Examiner—Kiran Patel
(74) Attorney, Agent, or Firm—Ramon L. Pizarro; Edwin H. Crabtree

(57) ABSTRACT

A self-contained toolbox adapted for use in the bed of a truck. The toolbox covering at least a major portion of the bed of the truck. The toolbox including an external box and an internal box having an interior opening. The internal box fitting within the external box and being movable from a first position where the external box covers at least some of the access to the interior opening of the internal box, and a second position, above the external box, where the external box does not inhibit access to the interior opening of the internal box.

17 Claims, 3 Drawing Sheets

SELF CONTAINED STORAGE DEVICE FOR TRUCKS

BACKGROUND OF THE INVENTION (a) Field of the Invention

This invention generally relates to a storage container that has been adapted for installation in the back of a truck. More particularly, but not by way of limitation, to a self contained storage box that slides into the back or bed of a pickup truck and includes a self contained elevating mechanism for raising and lowering the internal components of the storage box to allow access to the cargo area of the truck and into the storage area of the storage box.

(b) Discussion of Known Art

The pick-up truck, referred to herein as simply a truck, has gained tremendous popularity for its versatility as a cargo-carrying device and as a vehicle that can be used for recreational purposes, such as for camping or supporting a camper shell structure. Unfortunately, however, the versatility of the truck is often cut short or limited by the fact that devices that are used with the truck often require permanent modification of the truck's bed or permanent attachment to the truck's bed. This problem can be particularly acute for individuals who may use the truck during the week for the purpose of carrying work tools and equipment, and during the weekend for carrying sports equipment such as motorcycles or camping equipment. In order to relieve the truck of all the work equipment, the user often has to remove components that have been permanently affixed to the bed of the truck. This may be so burdensome that the user may simply resort to adding a trailer or using another vehicle for the purpose of carrying the sports equipment.

Examples of known toolboxes that can be raised or lowered to reveal or conceal tools or other materials held in the be bed of the truck can be found in U.S. Pat. No. 4,469,364 to Rafi-Zadeh or U.S. Pat. No. 4,328,989 to Childers. These devices include telescopic corner posts that are used to raise or lower the cover or entire device and provide access to the tools or other materials being stored in the bed of the truck. These examples highlight the problems associated with known devices. They require permanent modification of the truck's bed. They are fastened directly to the bed, and thus prevent easy or convenient removal of the device to allow the vehicle to be used for other purposes. Still further, these devices are not designed for unitary removal, together with articles held or stored within the devices. Therefore, the user must empty the storage device, and then remove the storage device from the bed of the truck.

Other known devices are simply toolboxes with the ability to tilt, include drawers that can be pulled out of the device. Examples of these types of devices can be found in U.S. Pat. No. 5,593,201 to Bateman or U.S. Pat. No. 4,936,624 to West.

Therefore, a review of known devices reveals that there remains a need for a simple, self-contained device that can be positioned in the bed of a truck and used to store materials. The device cooperating with the bed of the truck to conceal or enclose the materials being held in the device.

There remains a need for a toolbox that can take advantage of the entire bed of the truck to hold materials and equipment within the bed of the truck, and to provide automated opening and closing of the toolbox.

Still further, there remains a need for a large, self contained toolbox that included mechanized, automated opening and closing function in a manner that provides convenient access to the contents of the toolbox when in the opened position. Preferably, the access being from at least three sides of the box, the sides including the passenger and driver side of the truck, as well as the rear of the truck.

There remains a need for a device that combines a self raising toolbox and truck bed cover that can cooperate with the bed of the truck to fully enclosed the contents of the toolbox.

There remains a need for a self contained, self opening toolbox that can be slid into and out of the bed of a truck to allow the truck to be used for different purposes.

SUMMARY

It has been discovered that the problems left unanswered by known art can be solved by providing a self contained box adapted for use in the bed of a truck, the box including:

An external box, and

An internal box having an interior opening, the internal box fitting within the external box and being movable from a first position where the external box covers at least some of the access to the interior opening of the internal box, and a second position, above the external box, where the external box does not inhibit access to the interior opening of the internal box.

According to one example of an application of the principles taught here, the internal box includes a pair of generally vertical end-panels and a roof panel. The roof panel has been sized to cooperate with the sides, or walls, of the bed of the truck so that the roof panel completely covers the bed of the truck when the internal box is in the first position. Thus, when the internal box is in the first position, the roof panel provides the appearance of what is known as a "tonneau" cover, but provides the rigid support of the structure of the roof panel.

In order to move the internal box from the first position to the second position, it is contemplated that lifting mechanism, such as a hydraulic cylinder, a scissor jack, screw drive, ratchet and pawl, or any other suitable mechanism may be held between the two boxes, allowing the lifting mechanism to urge the internal box against the external box to raise the internal box relative to the external box. Once the internal box has been raised, access to the internal opening of the internal box is revealed past the external box.

According to one example of the invention, an internal panel or support web extends between the end panels, and will preferably include connections to the roof panel, so that the internal box is rigid enough to resist the force of the lifting mechanism as it pushes the internal box away from the external box. In another example, at least one wall panel extends between the end panels and attaches to the end panels and the roof panel. An advantage of this configuration is that it results in an extremely rigid structure that not only allows the raising of the internal box, but also allows external loading of the roof panel, preferably when the internal box is in the first position.

To take advantage of the rigidity provided by the use of a wall panel, an example of the invention includes a pair of wall panels that are spaced apart from one another to define an internal enclosure or compartment for the lifting mechanism. In addition to the use of the wall panels, it is contemplated that shelving or drawers may be incorporated into the internal box, between the end panels and the wall panel or panels.

Still further, it is contemplated that the external box and the internal box may be shorter than the length of the bed of the truck, and thus the toolbox will leave a gap between an end of the box and one the walls of the bed or the tailgate of the truck. The roof panel may still be sized to cover the entire bed of the truck, and thus defining a separate storage compartment between the end of the toolbox, the roof panel and the floor and sides or tailgate of the truck.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
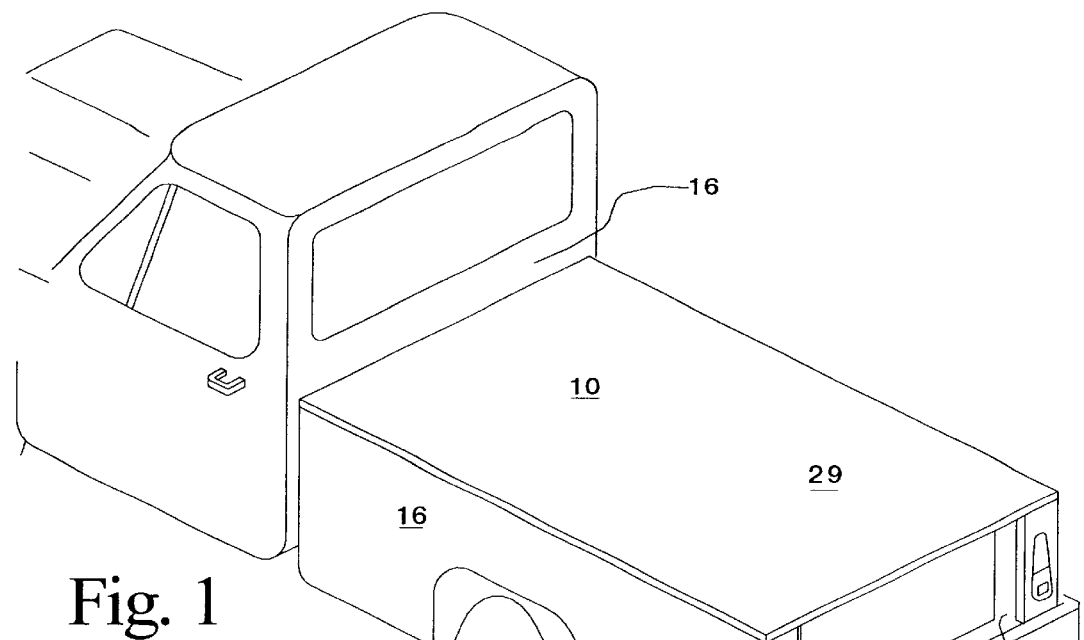
FIG. 1 is a perspective view of an embodiment of the invention in the lowered position, with the roof panel providing the appearance of a tonneau cover.
Figure 2:
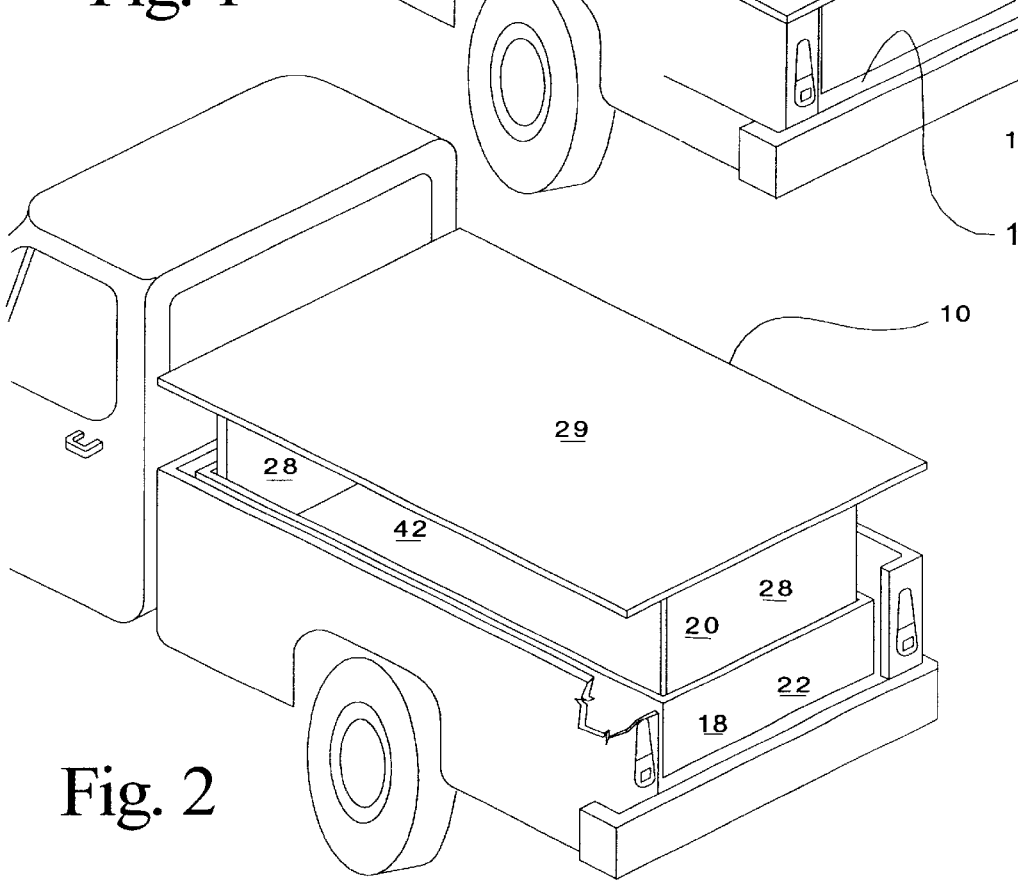
FIG. 2 illustrates the embodiment shown on FIG. 1, with the internal box in the second, raised position, providing access to the internal space of the internal box.

Turning now to FIGS. 1 and 2, where a self-contained toolbox 10 adapted for use in a truck bed 12. It is important to note that the term "toolbox" as used herein is intended to cover all types of storage compartments, and thus the intended use should not be considered a limitation of the disclosed invention. The truck bed 12 includes a floor 14, and at least one side 16 extending vertically from or next to the floor 14 of the truck bed 12. Thus, it is contemplated that the disclosed invention may be used with conventional pickup trucks, which include beds that have three fixed, vertical sides and a tailgate extending across the rear of the truck's bed, as well as with flatbed trucks.

Figure 3:
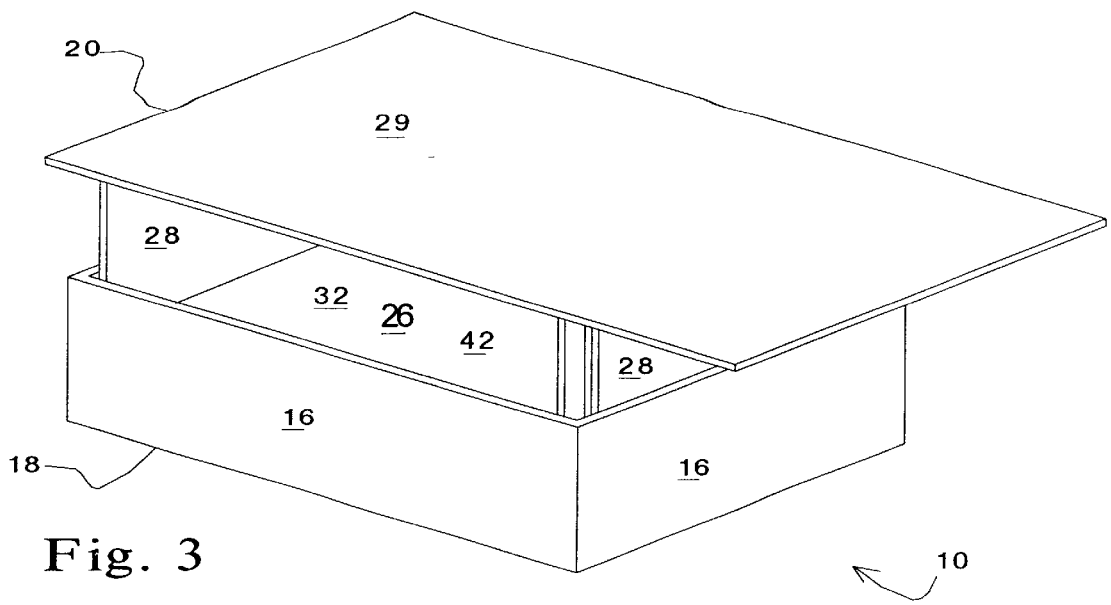
FIG. 3 is a perspective view of an embodiment of the invention with the internal box in the second position.
Figure 4:
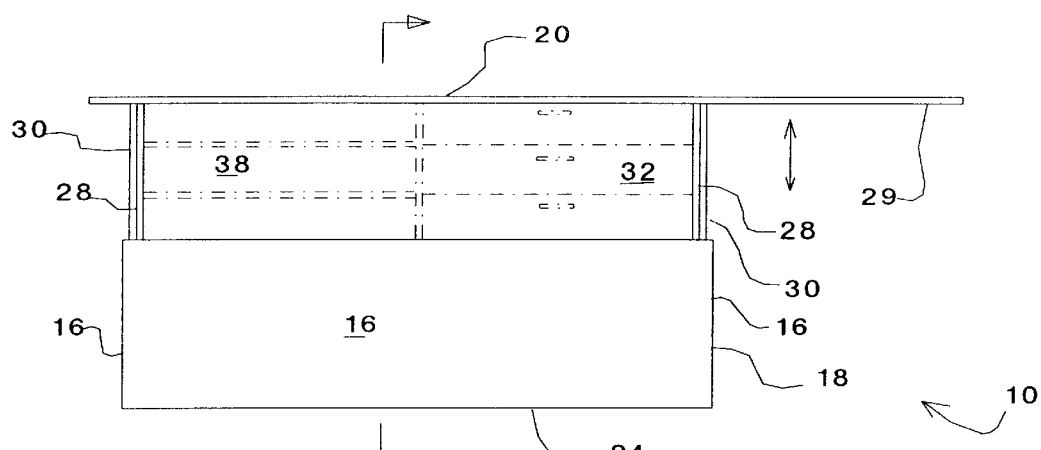
FIG. 4 is a side view of the embodiment illustrated in FIG. 3, with the internal box in the raised, second position.
Figure 4A:
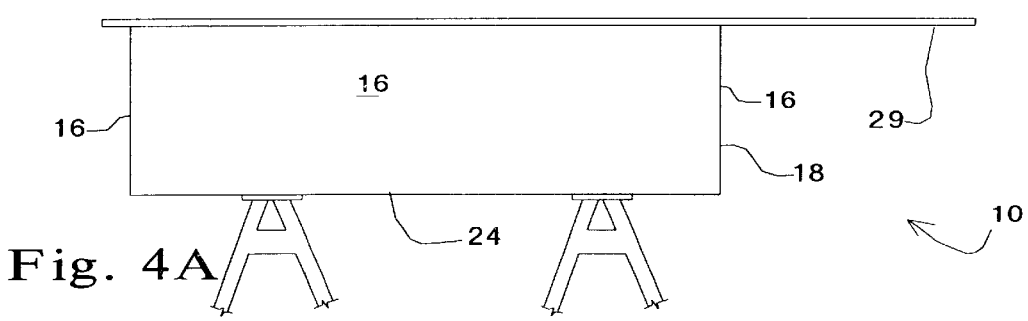
FIG. 4A illustrates the embodiment shown in FIG. 4, with the second, internal box in the lowered, or first position. The entire toolbox has been shown withdrawn from the bed of the truck and supported by a pair of saw-horses or stands.

Turning now to FIGS. 3, 4, and 4A, it will be understood that the illustrated example of the toolbox 10 includes an external box 18, and an internal box 20. The internal box 20 will cooperate with the external box 18 to allow sliding movement of the internal box 20 relative to the external box 18. It is important to note that the structure of the disclosed invention allows extremely efficient use of the structural components to achieve the important new and useful results taught herein.

As illustrated in FIGS. 3 and 4, the external box 18 will include sides 22 and a floor 24 that will define an enclosed space 26. The internal box 20 will preferably include a pair of end panels 28 that are attached to a roof panel 29. The internal box 20 moves vertically while gaining support from the external box 18. The internal box 20 is moved from a first, closed position illustrated in FIGS. 1 and 4A, to a second, opened position illustrated in FIGS. 2, 3, and 4. The end panels 28 of the internal box 20 may include tracks 30 or other mechanisms that allow controlled vertical movement of the internal box 20 relative to the external box 18 from the first position to the second position, and back. As illustrated, the movement being generally vertically from the first position where the external box covers at least some of the access to an interior opening 32 between the end panels 28 of the internal box 20, and the second position, above the external box 18, where the external box 18 does not inhibit access to the interior opening 32 of the internal box 20.

The interior opening 32 provides an area between the end panels 28 for providing storage devices, such as drawers or shelves, that move with the internal box 20. Thus, when the internal box 20 is lowered into the external box 18, the interior opening 32 of the internal box 20 is covered by the sides 22 of the external box 18, blocking access to the shelves, drawers or other items found within the interior opening 32 of the internal box 20.

Figure 5:
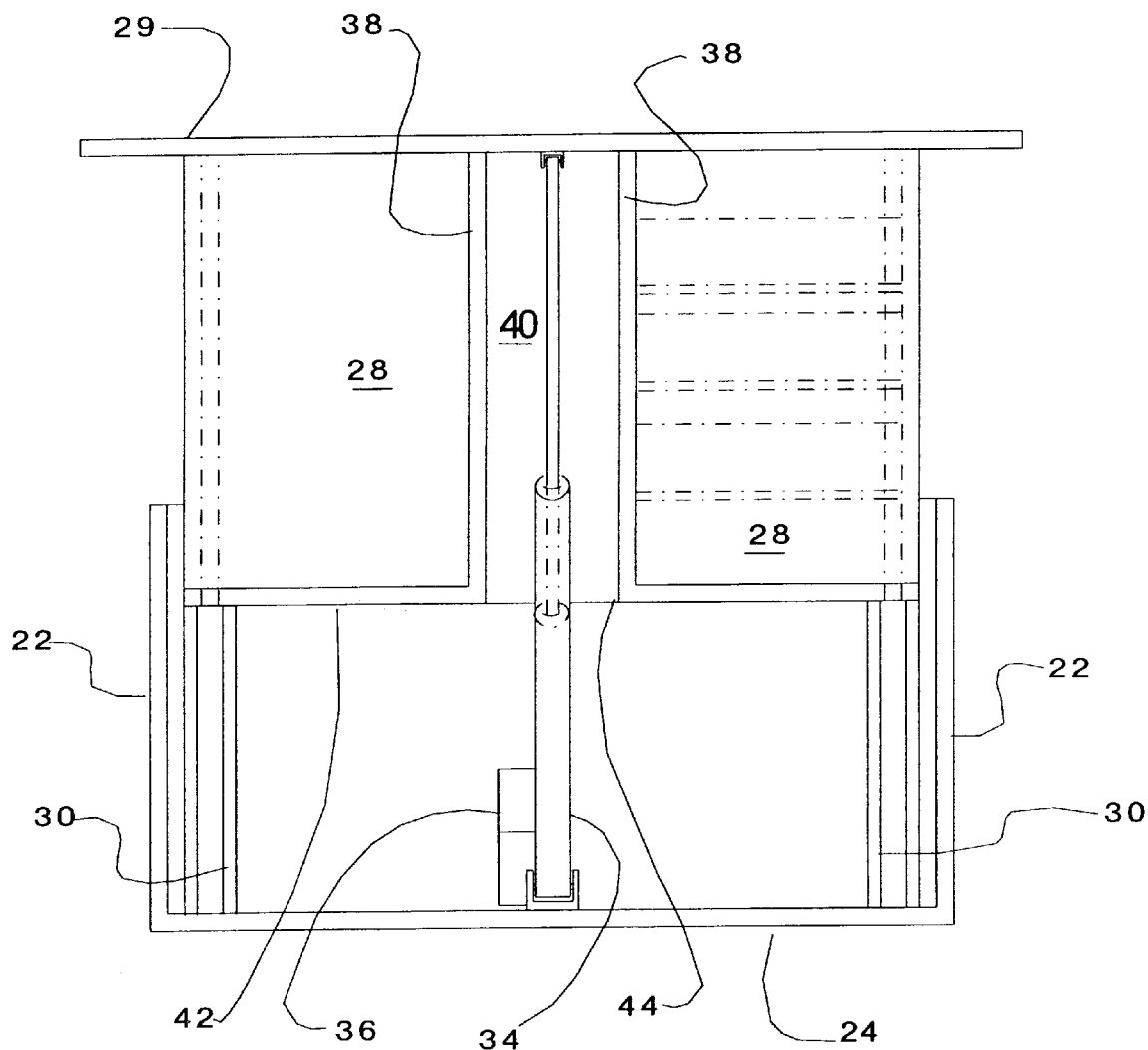
FIG. 5 illustrates the use of a pair of wall panels to define a space for the lifting mechanism. The type of lifting mechanism shown being for illustration purposes only.

Referring now to FIGS. 4 and 5, it will be understood that it is contemplated that the toolbox 10 will accommodate a lift mechanism 34 that will move the internal box 20 from the first position to the second position. As shown on FIG. 5, the lift mechanism 34 will expand between the internal box 20 and the external box 18 to move the internal box 20 away from the external box. It is contemplated that this expansion may be accomplished by way of a scissor jack mechanism, a screw drive, a ratchet and pawl mechanism, a piston based mechanism or other mechanism that will lift the internal box 20 up from the external box 18.

Thus, it is contemplated that the lift mechanism 34 may include a power source 36 that is housed within the toolbox 10, or may include connectors that provide power, such as electrical power, hydraulic, or pneumatic power, to the lift mechanism 34. It is further contemplated that a remote control mechanism, which may be a wireless system or a physical connection, such as wiring or fluid control mechanism, may be used to activate the lift mechanism 34.

Also illustrated in FIG. 5 is that it is contemplated that at least one wall panel 38 will extend between the two end panels 28, approximately bisecting or dividing the end panels in two approximately equal sections. The illustrated example includes a pair of wall panels 38 that are spaced apart from one another to define an enclosure 40 for enclosing the lift mechanism 34. This configuration provides significant advantages in that the wall panels 38 cooperate with the end panels 28 and the roof panel 29 to create a rigid structure that can support drawers or shelves supported by the internal box 20. Also, the it is contemplated that the lift mechanism 34 will push on the internal box 20, and as illustrated, on the wall panels 38 or the roof panel 29. Thus, the rigidity and strength imparted by the disclosed structure allows the use of a centrally located lift mechanism 34, which produces important new and useful, synergistic results. Importantly the centralized lift mechanism 34 results in the need to use small, if any, tracks 30. This is because the end panels 28 can cooperate with the sides 22 of the external box 18 to align and stabilize the internal box 20 as it is raised or lowered. Furthermore, the use of a centralized lift mechanism obviates jamming problems associated with mechanisms that lift from the corners. The jamming stemming from uneven lifting rates on opposite corners.

The enclosed figures also illustrate that it is contemplated that the internal box 20 may include an internal floor 42 that includes an internal aperture 44 for the lift mechanism. Also illustrated is that the roof panel 29 may extend beyond the end panels 28 to create additional storage areas between the external box 18 or the internal box 20 and the sides 16 or tailgate of the truck bed 12.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A self contained toolbox adapted for use in a truck bed, the truck bed having a floor, and at least one side extending vertically from next to the floor of the truck bed, the toolbox comprising:
    an external box, and
    an internal box having a roof panel and an interior opening, the internal box cooperating with the external box to allow sliding movement of the internal box relative to the external box, the movement being generally vertically from a first position where the external box covers at least some of the access to the interior opening of the internal box, and a second position, above the external box, where the external box does not inhibit access to the interior opening of the internal box; and
    a lift mechanism mounted below the roof panel, between the internal box and away from the external box, the lift mechanism being adapted for moving the internal box from the first position to the second position.

2. A toolbox according to claim 1 wherein said internal box includes a pair of end panels spaced apart from one another to define the interior opening, and the interior panels fit within said external box.

3. A toolbox according to claim 1 wherein said internal box includes a pair of end panels spaced apart from one another to define the interior opening, and the interior panels fit within said external box.

4. A toolbox according to claim 3 wherein said internal box further comprises a roof panel that supports said end panels, the roof panel extending beyond the end panels and being adapted for projecting over at least most of the floor of the bed of the truck.

5. A toolbox according to claim 4 wherein said end panels and said roof panel are connected to at least one wall panel extending between the end panels and approximately bisecting said end panels.

6. A toolbox according to claim 5 wherein said toolbox includes a pair of spaced apart wall panels that approximately bisect the end panels, the wall panels enclosing the lift mechanism.

7. A self contained toolbox adapted for use in a truck bed, the truck bed having a floor, and at least one side extending vertically from next to the floor of the truck bed, the box comprising:
    an external box, and
    an internal box having an interior opening, the internal box fitting within the external box to and cooperating the external box to allow sliding movement of the internal box relative to the external box, the movement being from a first position where the external box covers at least some of the access to the interior opening of the internal box, and a second position, above the external box, where the external box does not inhibit access to the interior opening of the internal box; and
    an expanding lift mechanism mounted below the roof panel, between the internal box and away from the external box, the expanding lift mechanism being adapted for pushing up towards the roof panel of the internal box to move the internal box from the first position to the second position.

8. A toolbox according to claim 7 wherein said internal box includes a pair of end panels spaced apart from one another to define the interior opening, and the interior panels fit within said external box.

9. A toolbox according to claim 7 wherein said internal box includes a pair of end panels spaced apart from one another to define the interior opening, and the interior panels fit within said external box.

10. A toolbox according to claim 9 wherein said internal box further comprises a roof panel that supports said end panels, the roof panel extending beyond the end panels and being adapted for projecting over at least most of the floor of the bed of the truck.

11. A toolbox according to claim 10 wherein said end panels and said roof panel are connected to at least one wall panel extending between the end panels and approximately bisecting said end panels.

12. A toolbox according to claim 11 wherein said toolbox includes a pair of spaced apart wall panels that approximately bisect the end panels, the wall panels enclosing the lift mechanism.

13. A method for creating a self contained,
    removable storage device and truck bed cover for a truck bed, the truck bed having a floor surrounded by at least three sides projecting upwardly from the floor of the bed and a tailgate, the method comprising:
        providing a self contained toolbox comprising:
            an external box, and
            an internal box having an interior opening, the internal box fitting within the external box and cooperating with the external box to provide sliding movement of the internal box relative to the external box, the movement being from a first position where the external box covers at least some of the access to the interior opening of the internal box, and a second position, above the external box, where the external box does not inhibit access to the interior opening of the internal box, the internal box further having a roof panel that has been adapted for cooperating and coinciding with the sides of the truck bed to cover the bed of the truck;

a lift mechanism mounted between the internal box and the external box, the lift mechanism being adapted for moving the internal box from the first position to the second position;

moving the internal box, with the use of the lift mechanism, to the first position to cover the bed of the truck; and moving the internal box to the second position to provide access to the interior opening of the internal box.

14. A method according to claim 13 wherein said internal box includes a pair of end panels spaced apart from one another to define the interior opening, and the interior panels fit within said external box.

15. A method according to claim 13 wherein said internal box includes a pair of end panels spaced apart from one another to define the interior opening, and the interior panels fit within said external box.

16. A method according to claim 15 wherein the roof panel extends beyond the end panels and is adapted for projecting over at least most of the floor of the bed of the truck.

17. A method according to claim 16 wherein said toolbox includes a pair of spaced apart wall panels that approximately bisect the end panels, the wall panels enclosing the lift mechanism.

* * * * *